Aug. 2, 1949.   H. F. BENOIT   2,477,856
CYLINDER COUPLING
Filed Sept. 6, 1945
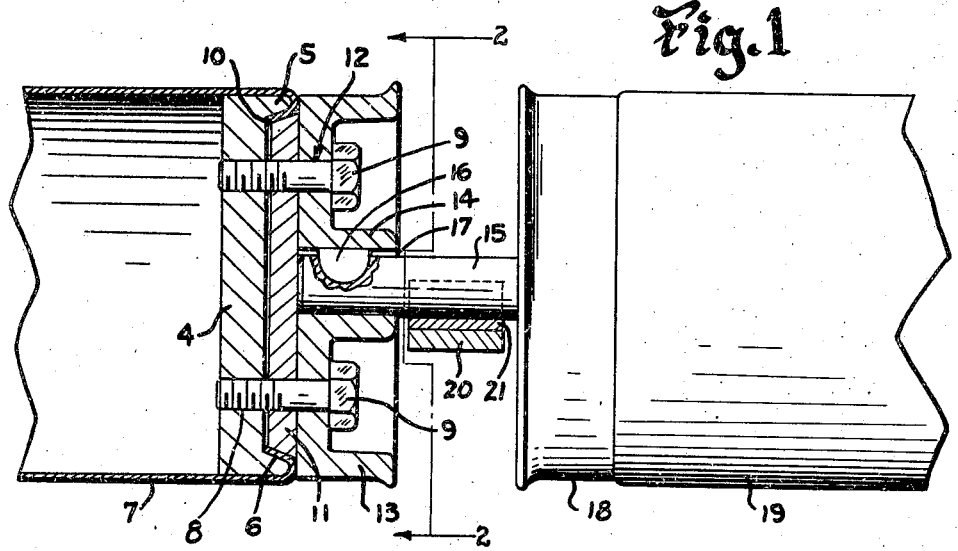
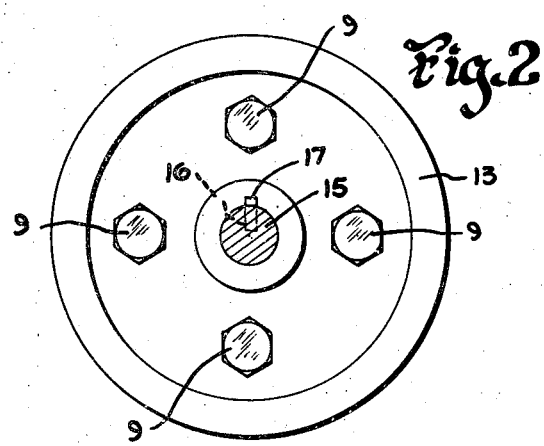
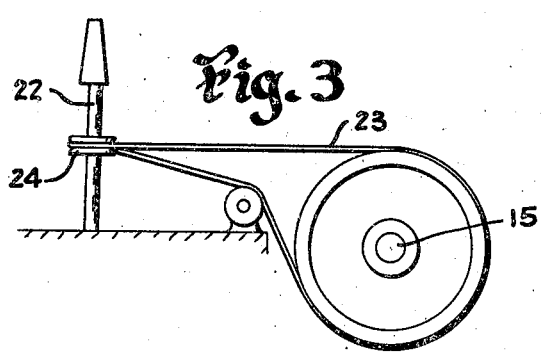
INVENTOR.
HENRY F. BENOIT
BY
Louis L. Gagnon
ATTORNEY Patented Aug. 2, 1949

2,477,856

UNITED STATES PATENT OFFICE 2,477,856

CYLINDER COUPLING

Henry F. Benoit, Charlton, Mass.

Application September 6, 1945, Serial No. 614,743

7 Claims. (Cl. 287—52.01)

This invention relates to improvements in cylinder couplings and method of making the same.

One of the principal objects of the invention is to provide an improved coupling and method for making the same for spindle driving cylinders such as are employed in wool spinning mules, twisters, spinning frames and the like.

Another object is to provide coupling means for spindle driving cylinders of the above character which will afford ease of removal or replacement of parts independently of other such cylinders and which will afford ease in repairing the bearings without requiring the removal of the cylinders.

Another object is to provide a coupling or head for cylinders of the above character whereby no solder connections are required for joining the parts and which will permit ease of assembly without requiring any opening or openings in the cylinder surface for the insertion of tools such as wrenches or the like required for tightening or loosening the parts.

Another object is to provide a coupling or head for cylinders of the above character which will assume a binding clamping relation with the adjacent ends of the cylinders when the coupling parts are assembled and which will retain said binding relation during the use of said cylinders.

Another object is to provide a cylinder coupling construction whereby the operating surfaces of the cylinders are continuous and smooth and thereby will avoid danger of cutting or wearing the spindle drive cords surrounding and moving longitudinally of said cylinders during the rotation thereof.

Other objects and advantages of the invention will become apparent from the following description taken in conjunction with the accompanying drawings. It is to be understood that many changes may be made in the details of construction, arrangement of parts and methods shown and described without departing from the spirit of the invention as expressed in the accompanying claims. I, therefore, do not wish to be limited to the exact details of construction, arrangement of parts and methods shown and described as the preferred form only has been given by way of illustration.

Referring to the drawings:

Fig. 1 is a fragmentary side elevational view of the coupling embodying the invention with a portion thereof shown in a cross-section;

Fig. 2 is a sectional view taken as on line 2—2 of Fig. 1 and looking in the direction indicated by the arrows; and Fig. 3 is a diagrammatic view illustrating one use of the cylinders embodying the invention.

With prior art cylinder couplings or heads it has been usual to utilize a head having a portion fitting within the end of the cylinder and solder connected with said cylinder and having a clamp portion extending from said head inwardly of the cylinder thereby requiring that the cylinder have an opening through its outer surface whereby a suitable wrench may be extended through said opening to tighten the clamp on the stub shaft.

In use several cylinders are connected in longitudinal axial relation with each other by such cylinder heads and stub shafts.

If a part should break in the cylinder head or the stub shaft bearing should become worn so as to require replacement of a part or parts with prior art constructions, it has been necessary to remove the entire cylinder as well as the adjacent cylinder thereby requiring discontinuance of the operation of the machine. It is quite apparent that with solder connections special heating devices were required to melt the solder and, in order to disassemble the head from the cylinder a wrench or the like had to be extended through the opening or openings therein in order to loosen the clamp means.

In many instances in the past the cylinder surrounding the opening would be bent due to slippage of the wrench or like and thereby causing a roughened or sharp protrusion to extend outwardly of the surface of the cylinder in the vicinity of the opening.

The above difficulties are entirely overcome by the present invention through the provision of a coupling or head which may be readily attached or detached from the spindle and attached to the cylinder without requiring any wrench opening to be formed in the cylinder and without requiring any solder connections.

A further advantage of the present invention is that the parts may be quickly and easily disassembled for replacement of parts without disturbing the function or operation of the adjacent cylinders and will insure a positive driving connection of said cylinders and obviate any surface irregularities or cutting edges which might cause the driving cords to be cut or worn before performing the full extent of their usefulness.

Referring more particularly to the drawings wherein like characters of reference designate like parts throughout the several views, the device embodying the invention comprises a disc 4 having a circumferential flange portion 5 extending outwardly of one side thereof and provided with a cone-shaped inner surface 6. The disc 4 is so dimensioned as to fit within the bore of the cylinder 7 and is provided with threaded openings 8 adapted to receive suitable coupling bolts 9. The adjacent end of the cylinder 7 is turned inwardly as shown at 10 to overlie the cone-shaped inner surface 6 of the circumferential flange portion 5. A clamp plate 11 having a peripheral substantially frusto-conical edge surface shape is adapted to fit within the flange 5 and is so dimensioned as to introduce a wedging action on the inturned portion of the cylinder 7 between the inner conical surface 6 of said flange portion 5 and the circumferential edge of the plate 11. This clamping action is introduced by tightening the bolts 9 which are first extended through suitable openings 12 formed in the driving head 13 and which are adapted to connect said driving head to the end of the cylinder 7 and simultaneously cause the plate 11 to bindingly engage the inturned end 10 of said cylinder and firmly retain said driving head and plate 11 in connected relation with the disc 4. The driving head 13 is provided with a central hub 14 in which the stub shaft 15 is adapted to extend. The stub shaft 15 is drivingly connected with the hub 14 by means of a Woodruff key 16 extending within a slot in said stub shaft and within a groove 17 in said hub.

The stub shaft 15 is connected with the driving head 18 of an adjacent cylinder 19 and which is identical with the driving head 13 and cylinder 7. The driving head 18 is connected with the cylinder 19 in the same manner as the connection between the cylinder 7 and the driving head 13. The stub shaft 15 is supported by a conventional bearing 20 having a lining 21 of bronze or other suitable material. In Fig. 3 there is shown a diagrammatic illustration of the use of one such cylinders wherein suitable spindles 22 are driven by drive cords 23 which surround the cylinders and a drive wheel 24 carried by the spindles 22.

From the above it will be apparent that when it is desired to disconnect the driving head from the cylinder all that is required is to extend a suitable socket wrench in between the driving heads to loosen the bolts 9. The slot 17 will permit the driving head to be moved longitudinally whereupon the cylinder 7 or 19, as the case may be, may be disconnected and parts replaced when necessary. It is quite apparent that one cylinder may be disconnected independently of the other and without disrupting the entire operation of the machine.

It is to be understood that the thickness of the plate 11 is such as to permit the adjacent surface of the driving head 13 to exert a pressure on said plate of an amount sufficient to force said plate into binding relation with the inturned end 10 of the cylinder 7 without said adjacent surface of the driving head 13 engaging the outermost end of the cylinder 7. In the drawings the parts are shown in their final clamped relation whereby little space remains.

It is to be understood, of course, that the cylinders are rotated by a suitable source of power so that they can in turn impart a driving action to the spindles as shown diagrammatically in Fig. 3.

From the foregoing description it will be seen that simple, efficient and economical means and method have been provided for accomplishing all of the objects and advantages of the invention.

Having described my invention, I claim:

1. A device of the character described comprising a cylinder, a disc setting within said cylinder and having a flange portion thereon with a cone-shaped inner surface, said cylinder having its end portion turned inwardly to overlie the cone-shaped surface, a plate fitting within said turned-in end portion and having a tapered peripheral surface for introducing a wedging action on the inturned end portion of the cylinder between said peripheral surface and the cone-shaped surface on the disc, a driving head and means for securing said driving head to said disc and for simultaneously forcing the plate into binding relation with the inturned end of the cylinder.

2. A device of the character described comprising a cylinder, a disc fitting within the end of said cylinder, said disc having a flange portion with a tapered inner surface and having a plurality of threaded openings therein, said cylinder having its end turned inwardly to overlie the tapered surface of the flange portion, a plate with a tapered peripheral surface fitting within said flange portion and overlying the inwardly turned end of the cylinder, said plate having a plurality of openings therein aligned with the threaded openings in the disc, a driving head having a plurality of openings therein aligned with the openings in the plate and disc and bolt-like means extending through said aligned openings and threadedly connected with the threaded openings in the disc and being adapted to engage the adjacent side surface of the plate when said bolts are tightened to force said plate into binding relation with the inturned end of the cylinder and to simultaneously force said inturned end into binding relation with the inner tapered surface of the flange portion.

3. A device of the character described comprising a cylinder, a disc setting within said cylinder and having a flange portion thereon with a cone-shaped inner surface, said cylinder having its end portion turned inwardly to overlie the cone-shaped surface, a plate fitting within said turned-in end portion and having a tapered peripheral surface for introducing a wedging action on the inturned end portion of the cylinder between said peripheral surface and the cone-shaped surface on the disc, a driving head and means for securing said driving head to said disc and for simultaneously forcing the plate into binding relation with the inturned end of the cylinder, said driving head having a hub centrally thereof, a stub shaft extending in said hub and means drivingly interconnecting said stub shaft with said hub.

4. A device of the character described comprising a cylinder, a disc fitting within the end of said cylinder, said disc having a flange portion with a tapered inner surface and having a plurality of threaded openings therein, said cylinder having its end portion turned inwardly to overlie the tapered surface of the flange portion, a plate with a tapered peripheral surface fitting within said flange portion and overlying the inwardly turned end portion of the cylinder, said plate having a plurality of openings therein aligned with the threaded openings in the disc, a driving head having a plurality of openings therein aligned with the openings in the plate and disc and bolt-like means extending through said aligned openings and threadedly connected with the threaded openings in the disc and being adapted to engage the adjacent side surface of the head when said bolts are tightened to force said plate into binding relation with the inturned end of the cylinder and to simultaneously force said inturned end into binding relation with the inner tapered surface of the flange portion, said driving head having a hub centrally thereof, a stub shaft extending in said hub and means drivingly interconnecting said stub shaft with said hub.

5. A device of the character described comprising a cylinder of bendable material, a member fitting within the cylinder having engagement means on the side thereof disposed toward an open end of said cylinder, said cylinder having a portion adjacent said open end turned inwardly to overlie the engagement means of said member in said cylinder, binding means engaging the inturned portion of the cylinder on the side thereof opposite the engagement means of the member in said cylinder and means connecting said binding means with the member in said cylinder and for urging the engagement means of said member and the binding means into binding relation with that portion of the cylinder which is turned inwardly to overlie the engagement means.

6. A device of the character described comprising a cylinder of bendable material, a member fitting within the cylinder having a portion on the side thereof disposed toward an open end of said cylinder formed with an inwardly tapering surface, said cylinder having a portion adjacent said open end turned inwardly to overlie the inwardly tapering surface, binding means engaging the inturned portion of the cylinder on the side thereof opposite the tapered surface and means connecting said binding means with the member in said cylinder and for urging the inwardly tapered surface and the binding means into binding relation with that portion of the cylinder which is turned inwardly to overlie the inwardly tapered surface.

7. A device of the character described comprising a cylinder of bendable material, a member fitting within the cylinder having a protruding flange portion on the side thereof disposed toward an open end of said cylinder, said flange portion having an inwardly tapering surface, said cylinder having a portion adjacent said open end turned inwardly to overlie the inwardly tapering surface, binding means having a tapered periphery engaging the inturned portion of the cylinder on the side thereof opposite the inwardly tapered surface and means connecting said binding means with the member in said cylinder and for urging the inwardly tapered surface of the flange portion and the tapered periphery of the binding means. into binding relation with that portion of the cylinder which is turned inwardly to overlie the inwardly tapering surface.

HENRY F. BENOIT.

REFERENCES CITED

The following references are of record in the file of this patent:

UNITED STATES PATENTS

| Number | Name | Date |
|---|---|---|
| 1,250,591 | Karl | Dec. 18, 1917 |
| 1,454,305 | Wilson | May 8, 1923 |